United States Patent
Foltz (12) 
(10) Patent No.: US 11,982,079 B1
(45) Date of Patent: May 14, 2024

(54) SPECIAL PURPOSE EOD AXIAL REPETITIVE JOINT

(71) Applicant: The United States of America as Represented by the Secretary of the Navy, Indian Head, MD (US)

(72) Inventor: Lee Foltz, Indian Head, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 917 days.

(21) Appl. No.: 16/602,375

(22) Filed: Sep. 26, 2019

(51) Int. Cl.
| | |
|---|---|
| *E04B 1/19* | (2006.01) |
| *F16B 7/00* | (2006.01) |
| *F42D 5/04* | (2006.01) |

(52) U.S. Cl.
CPC ............ *E04B 1/1912* (2013.01); *F16B 7/00* (2013.01); *E04B 2001/1927* (2013.01); *E04B 2001/1933* (2013.01); *E04B 2001/1936* (2013.01); *F42D 5/04* (2013.01)

(58) Field of Classification Search
CPC . B31D 5/04; A63H 3/08; A63H 33/10; A63H 33/16; A63H 33/08; A63H 33/044; E04B 7/10; E04B 7/102; E04B 7/105; E04B 7/107; E04B 1/1918; E04B 1/195; E04B 1/1933; E04B 1/19; E04B 1/1906; E04B 1/1912
See application file for complete search history.

(56) References Cited

U.S. PATENT DOCUMENTS

| | | | | |
|---|---|---|---|---|
| 3,264,021 A | * | 8/1966 | Artman | A63H 33/101 403/3 |
| 3,415,554 A | | 12/1968 | Papayoti | |
| 3,665,669 A | * | 5/1972 | Huber | E04C 1/40 229/930 |
| 4,608,799 A | * | 9/1986 | Hasegawa | E04B 2/18 52/578 |
| 4,635,411 A | * | 1/1987 | Kurzen | A63H 33/10 446/112 |
| 5,281,185 A | * | 1/1994 | Lee | A63H 33/10 446/85 |
| 5,624,031 A | * | 4/1997 | Fowler | B65D 5/302 493/137 |
| 6,644,166 B2 | | 11/2003 | Alexander et al. | |
| 6,799,797 B2 | | 10/2004 | Cochran et al. | |
| 8,286,402 B2 | * | 10/2012 | Fleishman | E04B 2/12 52/271 |
| 8,827,142 B2 | * | 9/2014 | Smith | B31B 50/26 229/199 |

(Continued)

*Primary Examiner* — Jessica L Laux
(74) *Attorney, Agent, or Firm* — Fredric J. Zimmerman (57) ABSTRACT

An exemplary axial joint includes a planar member having a first plurality of joined sections and a second plurality of joined sections perpendicular to the first plurality of joined sections. Each section of the first plurality of joined sections and the second plurality of joined sections has a pattern of apertures therein, and each section is foldable approximately perpendicular to an adjacent section. The pattern of apertures in a first section after folding is congruent with the pattern of apertures in a second section after folding, wherein the second section is parallel to the first section, after folding. An elongate member is arranged through the apertures of one or more sections of the planar member, after folding the sections of the planar member.

10 Claims, 9 Drawing Sheets

(56) References Cited

U.S. PATENT DOCUMENTS

| | | |
|---|---|---|
| 9,339,735 B2 | 5/2016 | Morris et al. |
| 10,351,291 B2 * | 7/2019 | Carman .................. B65D 5/22 |
| 11,110,368 B2 * | 9/2021 | Nawracala ............... B31D 5/04 |
| 2002/0012329 A1 | 9/2002 | Snelson |

* cited by examiner

SPECIAL PURPOSE EOD AXIAL REPETITIVE JOINT

ORIGIN OF THE INVENTION

The invention described herein was made in the performance of official duties by employees of the Department of the Navy and may be manufactured, used, licensed by or for the Government for any governmental purpose without payment of any royalties thereon.

BACKGROUND

Field of the Invention

This invention is related to equipment stands, and, in particular, to a collapsible joint that connects to elongated members to produce a three-dimensional lattice framework for supporting an EOD disruptor.

Description of the Background

Explosive devices typically contain highly volatile materials that can generate explosions and cause significant damage to persons and/or property upon activation. Explosive devices also typically contain components, such as firing trains and other electrical components, used to activate the explosive material to cause an explosion. Due to the potential damage caused by an explosive device, it is often necessary to disable such devices to prevent activation of the explosive material.

Bomb disposal is an extremely difficult and dangerous profession. Bomb technicians, also known as Explosive Ordnance Disposal (EOD) personnel (operators), are constantly exposed to explosive devices of varying power and sophistication. Explosive devices that bomb technicians routinely address may include traditional explosives as well as chemical or biological devices. Because of the clear and inherent danger in bomb disposal, various forms of protection and methods of handling explosive devices have been implemented to increase the safety and survival rate of a bomb technician in the event of inadvertent device detonation.

Disabling an explosive device can be an extremely dangerous activity for those responsible for performing the disabling operation, as well as those in proximity to the explosive device. Various techniques have been developed to disable explosive devices, such as remote and/or controlled activation (e.g., by activating the explosive device within a safe location), deactivation (e.g., by disconnecting the detonator), and/or robotic manipulation (e.g., by deploying a robot to move, activate or deactivate the explosive device). However, such techniques may not be feasible, for example, in situations where there is a high risk involved in moving, activating, or deactivating the explosive device.

Bomb technicians respond to and exploit improvised explosive devices or energetic threats including primary energetic items, such as blasting caps. Many explosive devices are located where it is difficult or impossible for remotely controlled vehicles to enter or navigate. In such cases, a bomb technician may be required to handle, personally, and transport an explosive device. Their work is typically hands-on, without necessarily being fully aware of the condition of the threat. EOD personnel need the ability to move or manipulate improvised explosive devices and blasting caps that are unstable or in an unknown condition, from a safe distance.

In addition, EOD personnel are typically required to carry the necessary EOD tools on their person for a long distance. This requirement may arise because the EOD work area is not easily accessible to vehicles or because vehicles are not available or for other reasons. In any event, the EOD tools and equipment must be small in size (or easily disassembled into a small size) and small in weight to enable carriage by an EOD operator.

Current methods used to provide a standoff distance for EOD shaped charges or position an EOD disrupter at a target require a unique stand. Current stands can be a simple plate with bent legs, 3D printed plastic arrangements, metal tubes connected with joints, etc. Current stands can be one-time use or for use multiple times. For dismounted EOD missions, it is necessary to have packable gear, which is lightweight and takes minimal space in their bag to successfully accomplish their mission without needing tools to assemble/disassemble. Stands may be damaged depending on the tool being used or not recovered after use due to limited mission time on scene. As well, the gear needs to be simple to use as to not impede the technician's concentration on the mission at hand. Commercial stand kits for EOD can also be expensive ($2,500) made of machined components. For this reason, there is a need for a scalable, low cost, effective stand for use with a variety of EOD tools and equipment. Tools and equipment can vary in weight and size from ounces to tens of pounds. This concept enables different materials to be used at different sizes to accommodate the variety of need for stands and frameworks for EOD operations.

SUMMARY

The invention described herein concerns a framework for shaped charge stands, disrupter stands, tool/equipment stands, etc., using a collapsible joint that connects to tubes, rods, or other cross-sectional shaped members to produce a three-dimensional lattice framework without tools. The collapsible joint can be made from a pattern of punched or cut-out holes or perforations formed in a flat piece having multiple portions that can be arranged into a box shaped structure. When arranged in three dimensions, the flat sides overlap to form a cube. Each portion of the flat piece contains holes or perforation that align in the folded position allowing different tubes, rods, or other rigid members to pass through with an offset from each other in three-dimensional space, allowing for a three-dimensional framework to be produced. The holes can be made in different sizes as well as be made from different cross-sectional shapes (e.g., rectangular, circular, L-shape, etc.) to accommodate the cross-sectional shape of the tube/rods.

According to an aspect of the invention, a planar member has a first axis and a second axis. The first axis is perpendicular to the second axis. The planar member includes a first plurality of sections along the first axis and a second plurality of sections along the second axis. Each section of the first plurality of sections and the second plurality of sections is made of a rectangular shape having a pattern of apertures therein. Each section is foldable approximately perpendicular to an adjacent section, and the pattern of apertures in a first section after folding is congruent with the pattern of apertures in a second section after folding. The second section is parallel to the first section, after folding.

According to an exemplary device herein, a planar member includes a first plurality of joined sections and a second plurality of joined sections perpendicular to the first plurality of joined sections. Each section of the first plurality of joined sections and the second plurality of joined sections has a pattern of apertures therein, and each section is foldable approximately perpendicular to an adjacent section. The pattern of apertures in a first section after folding is congruent with the pattern of apertures in a second section after folding, wherein the second section is parallel to the first section, after folding. An elongate member is arranged through the apertures of one or more sections of the planar member, after folding the sections of the planar member.

According to an exemplary structure herein, a box shaped device has a hollow interior and a pattern of apertures on each face of the box shaped device. Parallel faces of the box shaped device have congruent patterns of apertures. The structure includes a plurality of elongate members. Each elongate member of the plurality of elongate members is arranged into a first aperture of a first face of the box shaped device, through the hollow interior of the box shaped device, and out of a second aperture of a second face of the box shaped device.

DETAILED DESCRIPTION OF EXEMPLARY EMBODIMENTS

This disclosure relates to a Special Purpose EOD Axial Repetitive (SPEAR) joint made from a pattern of punched or cut-out holes arranged in a flat structure. When arranged in three dimensions, the flat sides form a cube, and the holes align allowing different tubes, rods, or other elongate members to pass through with an offset from each other in three-dimensional space allowing for a three-dimensional framework to be produced. While envisioned as a flat-pack item, the SPEAR joint also may be machined from a solid cube to increase the stiffness and strength of the joint. The holes can be made from a different size as well as be made from a different cross-sectional shape (e.g., rectangular, circular, L-shape, etc.) to accommodate the tube/rod's cross-sectional shape. The same joint may be used for all joints of the framework structure. The joints can be stored as a flat-pack using minimal space. Tubes or rods also may be used from an operator's surrounding such as branches from trees in the woods, bamboo, etc. The poles, tubes, or rods can be easily packed with the joints in a backpack and can be carbon fiber tubes, wood dowel, or metal rods/tubes. This depends on the weight and setup of the tool being used in the mission. The flat-packed SPEAR joint can be made of waterproof paper, molded or 3D printed rubber or plastic, carbon fiber, or metal (e.g., aluminum, titanium, or steel foil, sheet, or plate) depending on the type of framework to be assembled and weight needing to be held. Due to its low cost, the joints can be one-time use. The SPEAR joint can be made flexible or rigid depending on its size and material used. To make different types of arrangements a less stiff and thinner material (e.g., paper, plastic, rubber, or aluminum) may be used while a stiffer and thicker material can be used for box shaped structures. A binding (i.e., tape, rope, etc.) can also be used with the joint arrangement to prevent pull-out of the tubes/rods. In some cases, the tubes or rods can also have holes in the ends to lace the binding through the holes in the tubes/rods to prevent pull-out.

Figure 1:
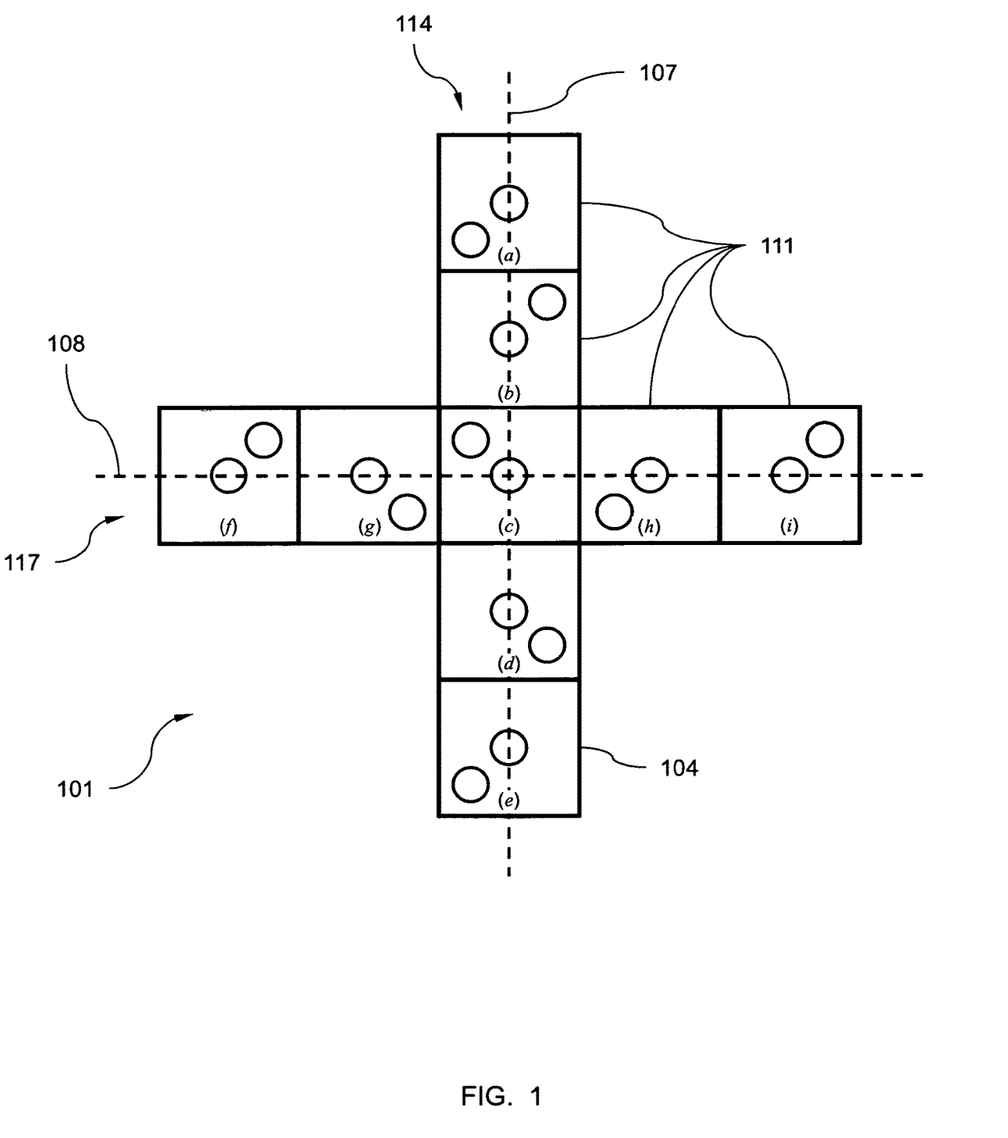
FIG. 1 shows a cruciform shape for a foldable axial joint according to devices herein.

Referring to FIG. 1, a cruciform shape, indicated generally as 101, includes a planar member 104 composed of sections 111 connected to adjacent sections along at least one edge. The planar member 104 has a first axis 107 and a second axis 108. The first axis 107 is perpendicular to the second axis 108. As shown in FIG. 1, the cruciform shape 101 includes a first plurality 114 of sections 111 (labeled a-e) along the first axis 107 and a second plurality 117 of sections 111 (labeled f-i) along the second axis 108. Note, in FIG. 1, the section 111 labeled (c) is included in both of the first plurality 114 of sections 111 along the first axis 107 and the second plurality 117 of sections 111 along the second axis 108.

Figures 2A, 2B:
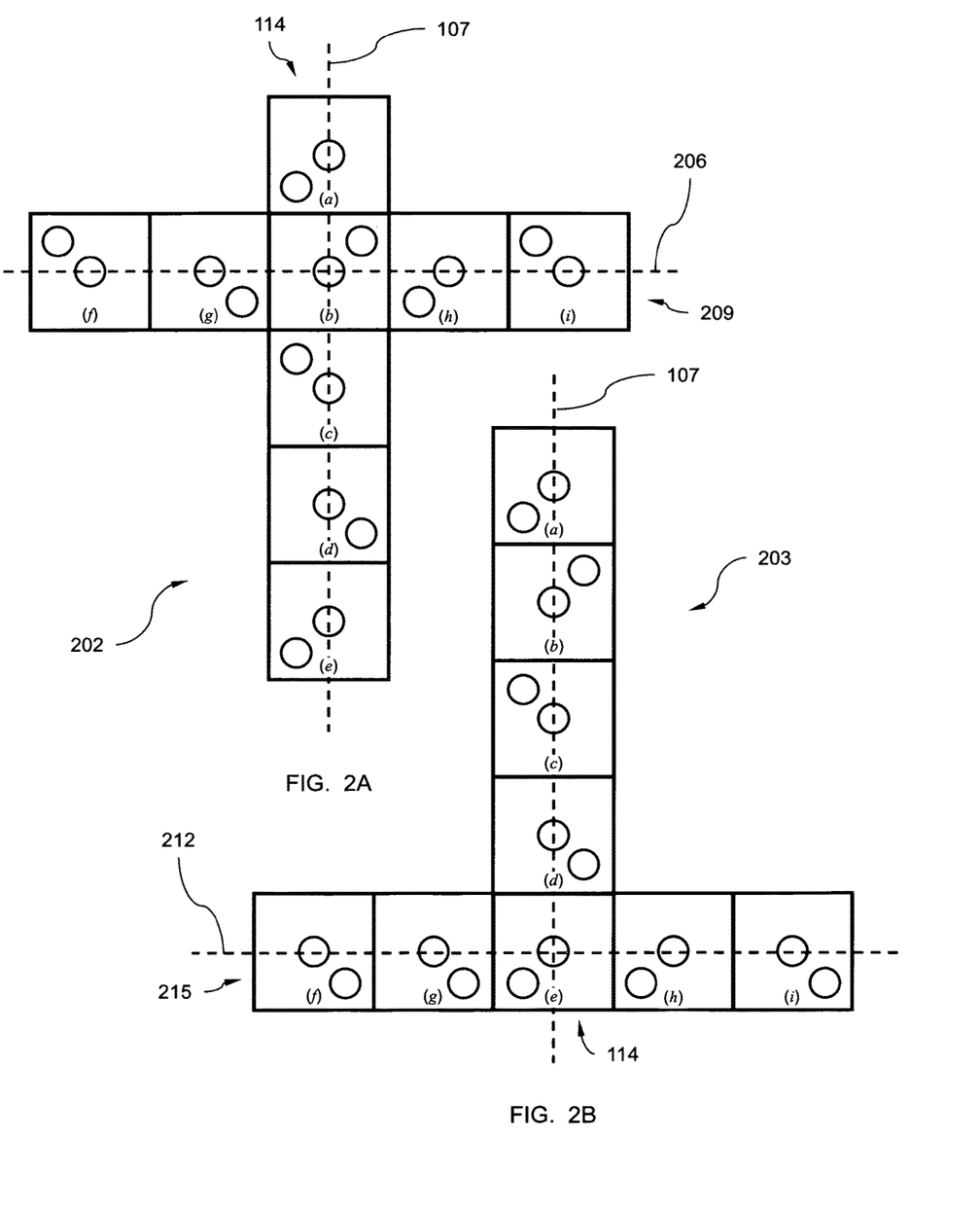
FIGS. 2A and 2B show alternate cruciform shapes for a foldable axial joint according to devices herein.

FIGS. 2A and 2B show alternate cruciform shapes, indicated generally as 202 and 203, respectively. In FIG. 2A, the cruciform shape 202 has a first axis 107 and a second axis 206. the cruciform shape 202 includes a first plurality 114 of sections 111 (labeled a-e) along the first axis 107 and a second plurality 209 of sections 111 (labeled f-i) along the second axis 206. Note, in FIG. 2A, the section 111 labeled (b) is included in both of the first plurality 114 of sections 111 along the first axis 107 and the second plurality 209 of sections 111 along the second axis 206. In FIG. 2B, the cruciform shape 203 has a first axis 107 and a second axis 212. the cruciform shape 203 includes a first plurality 114 of sections 111 (labeled a-e) along the first axis 107 and a second plurality 215 of sections 111 (labeled f-i) along the second axis 212. Note, in FIG. 2B, the section 111 labeled (e) is included in both of the first plurality 114 of sections 111 along the first axis 107 and the second plurality 215 of sections 111 along the second axis 212.

Figure 3:
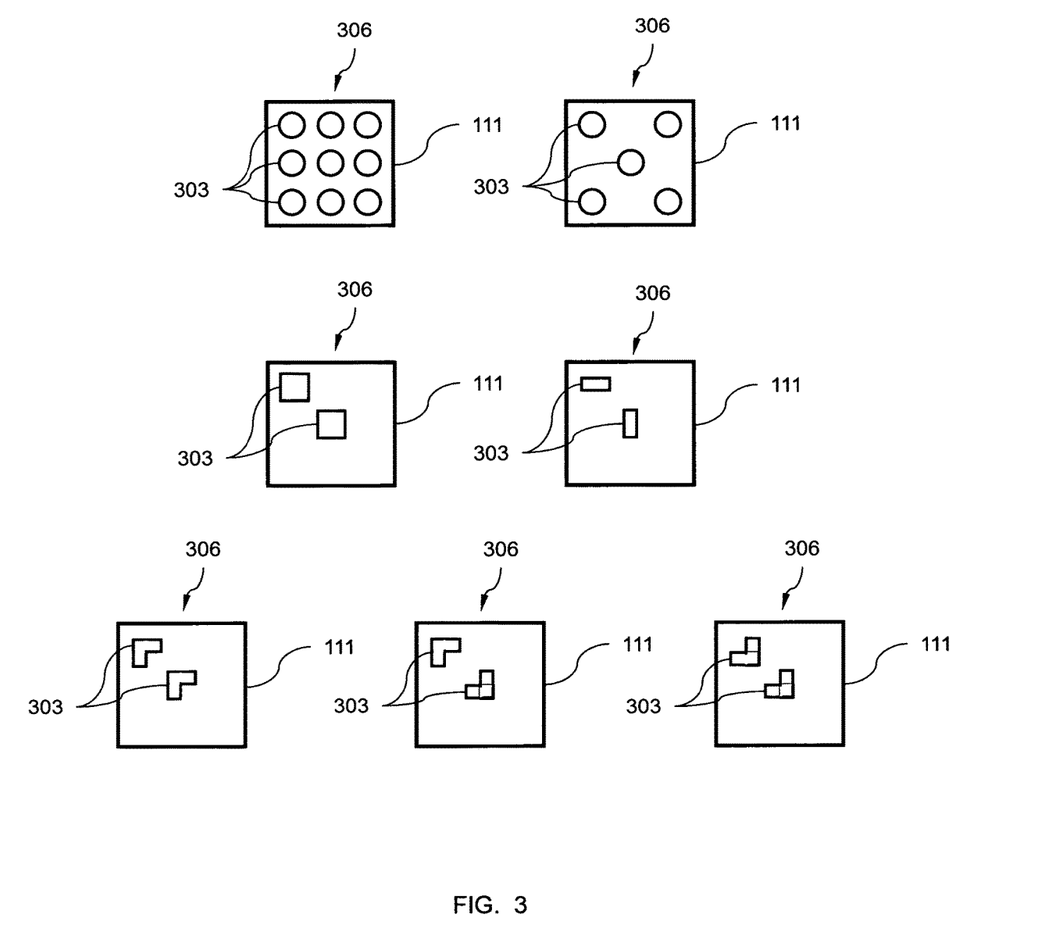
FIG. 3 shows a variety of aperture shapes for a foldable axial joint according to devices herein.

Referring to FIG. 3, each section 111 may be made in a rectangular shape. In some cases, the section 111 may be square. Additionally, at least the end section of each axis of the cruciform shape may have corners that are slightly rounded. Each section 111 has at least one aperture 303 therein. The aperture 303 may be punched, stamped, or cut-out of the section 111 in any appropriate shape, such as round, rectangular, square, pentagonal, hexagonal, L-shaped, etc. The size of the aperture 303 may be approximately ¼ to approximately ⅓ of the width of the section 111. As shown in FIG. 3, a plurality of apertures 303 may be arranged in a pattern 306 on the section 111. The pattern 306 may include up to nine apertures 303 on the section 111.

Figure 4:
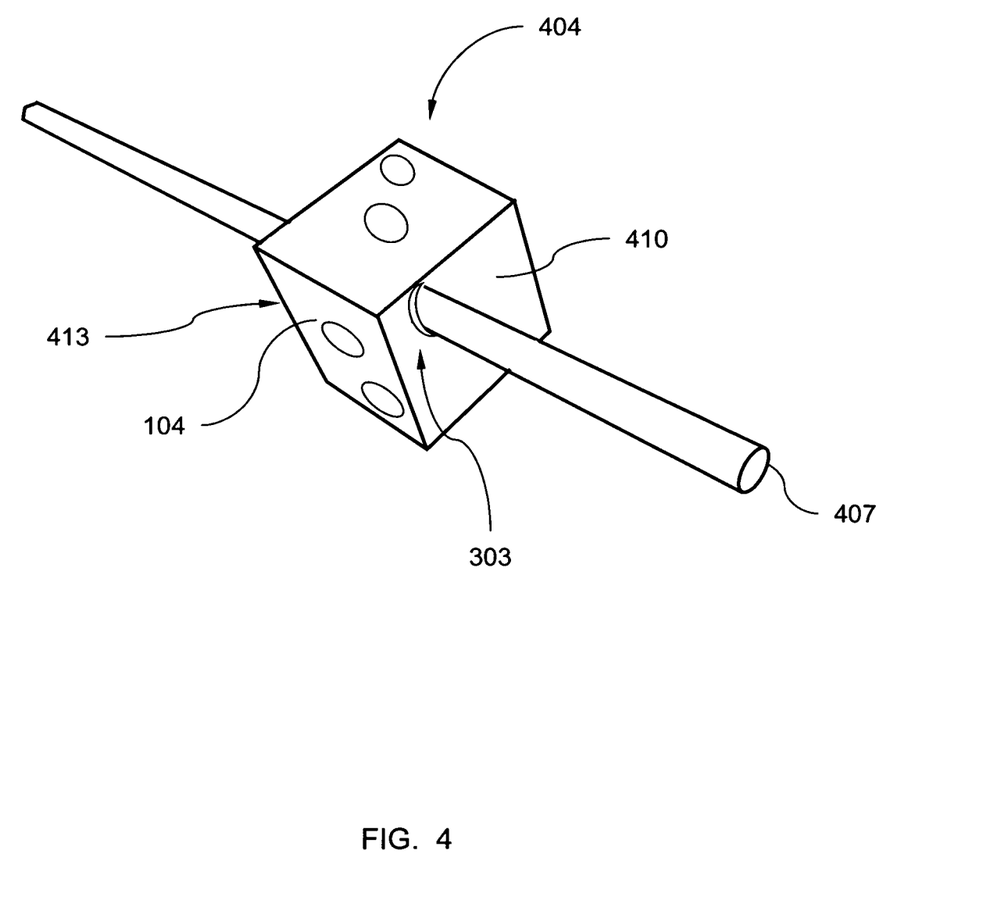
FIG. 4 shows an axial joint in a folded condition according to devices herein.
Figure 5:
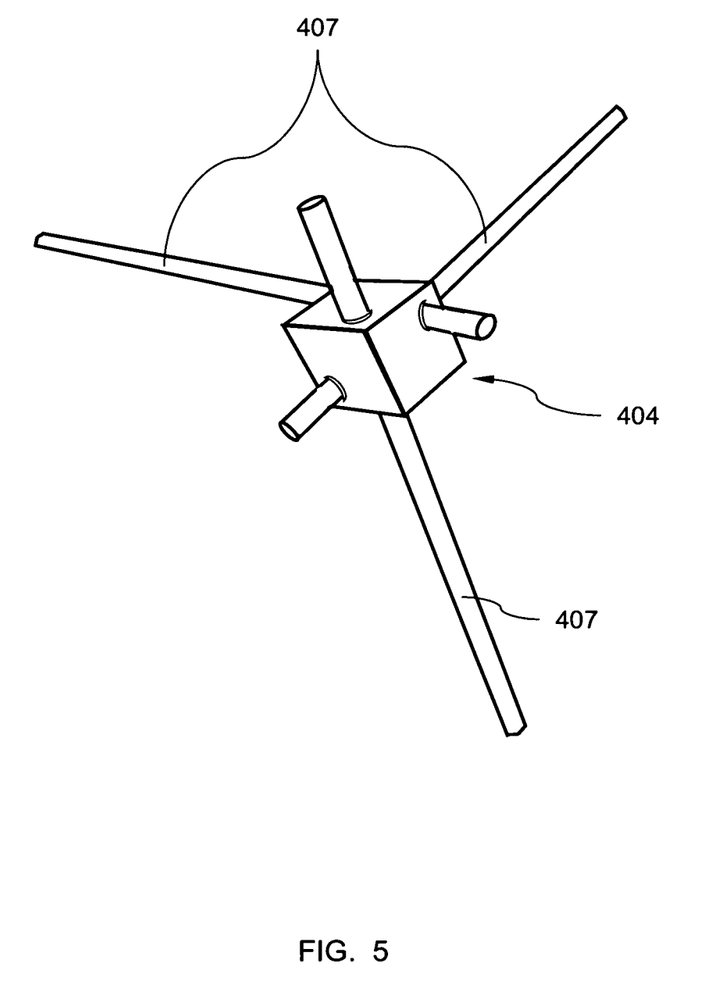
FIG. 5 shows a pyramidal structure using a three-axis foldable axial joint according to devices herein.

Each section 111 is foldable at its edges approximately perpendicular to each section 111 adjacent to it. Generally, the planar member 104 can be folded into a box shape or a cube, as shown in FIG. 4. The pattern 306 of apertures 303 may be arranged so that, after folding, apertures 303 in sections 111 that overlap are aligned. For example, referring to FIG. 1, after folding, the sections labelled b, d, g, and h will be orthogonal to the section labelled c, and the sections labelled a, e, f, and i will be parallel to the section labelled c. The pattern of apertures in each of the sections labelled a, e, f, and i is congruent with the pattern of apertures in the section labelled c, after folding. Referring to FIG. 2A, after folding, the sections labelled a, c, g, and h will be orthogonal to the section labelled b, the sections labelled d, f, and i will be parallel to the section labelled b, and the section labelled e will be parallel to the section labelled a. The pattern of apertures in each of the sections labelled d, f, and i is congruent with the pattern of apertures in the section labelled b, after folding, and the pattern of apertures in the section labelled a is congruent with the pattern of apertures in the section labelled e, after folding. Note also that the pattern 306 in each of the sections labelled f and i in FIG. 1 is different from the pattern 306 in each of the sections labelled f and i in FIG. 2A. Referring to FIG. 2B, after folding, the sections labelled d, g, and h will be orthogonal to the section labelled e, the sections labelled c, f, and i will be parallel to the section labelled e, the section labelled b will be parallel to the section labelled d, and the section labelled a will be parallel to the section labelled e. The pattern of apertures in each of the sections labelled c, f, and i is congruent with the pattern of apertures in the section labelled e, after folding, the pattern of apertures in the section labelled b is congruent with the pattern of apertures in the section labelled d, after folding, and the pattern of apertures in the section labelled a is congruent with the pattern of apertures in the section labelled e, after folding. Note also that the pattern 306 in each of the sections labelled f and i in FIG. 1 is different from the pattern 306 in each of the sections labelled f and i in FIG. 2B.

The planar member 104 may be made from a bendable material, such as paper, plastic, rubber, or aluminum. Other materials may be used, such as waterproof paper, molded or 3D printed rubber or plastic. In some cases, the planar member 104 may be made from a rigid material having hinges connecting the sections 111. For example, aluminum, titanium, or steel foil, sheet, or plate can be used, depending on the type of framework to be assembled and weight needing to be held. The thickness of the planar member may range from approximately 1 mil to approximately 0.5 inches. Generally, the planar member 104 will be stored flat and folded into a three-dimensional shape for use. In some embodiments, a three-dimensional cube or box having appropriate apertures may be built by the use of 3-dimensional printing. Additionally, an aperture 303 may have internal threads for receiving a threaded piece.

Referring again to FIG. 4, according to devices and methods herein, the planar member 104 may be folded into a three-dimensional shape (e.g., a box-shaped device) to form an axial joint 404. The axial joint 404 can then use one or more elongate members 407 to form a three-dimensional structure. Each elongate member 407 may be arranged into a first aperture 303 of a first face 410 of the axial joint 404, through the interior, and out of a second aperture 303 of a second face 413 of the axial joint 404. The elongate member 407 helps to hold sections 111 of the planar member that overlap in place while in the folded condition. A variety of pieces can be used as an elongate member 407. For example, the elongate member 407 may be poles, tubes, or rods. In some cases, the tubes or rods can be used from an operator's surrounding such as branches from trees in the woods, bamboo, etc. The poles, tubes, or rods can be easily packed with one or more axial joints 404 in a backpack and can be carbon fiber tubes, wood dowel, or metal rods/tubes. The elongate member 407 may be shaped to conform to the apertures 303, see FIG. 3. That is, different cross-sectional shapes (solid, hollow, circular, L-shaped, I-shaped, etc.) can be used for the elongate member 407. In some embodiments, a binding (i.e., tape, rope, pin, etc.) can also be used with the axial joint 404 to keep the elongate member 407 from pulling out. That is, the aperture 303 may have a seal or other type of friction device to prevent pull-out of the elongate member 407. As noted above, the elongate member 407 may include external threads to be received in an internally threaded aperture 303. In some cases, the tubes or rods can also have holes in the ends to lace a binding through the holes in the tubes/rods to prevent pull-out.

Figure 6:
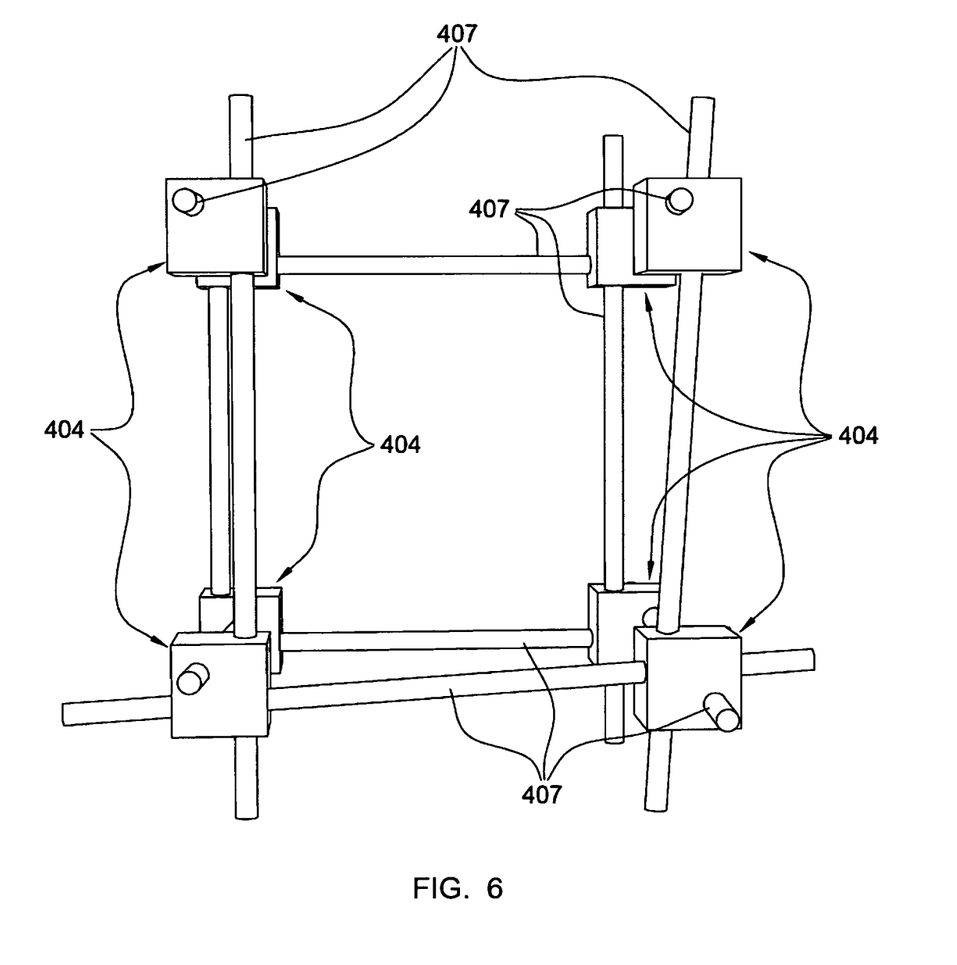
FIG. 6 shows a top view of a rectangular structure using a three-axis foldable axial joint according to devices herein.
Figure 7:
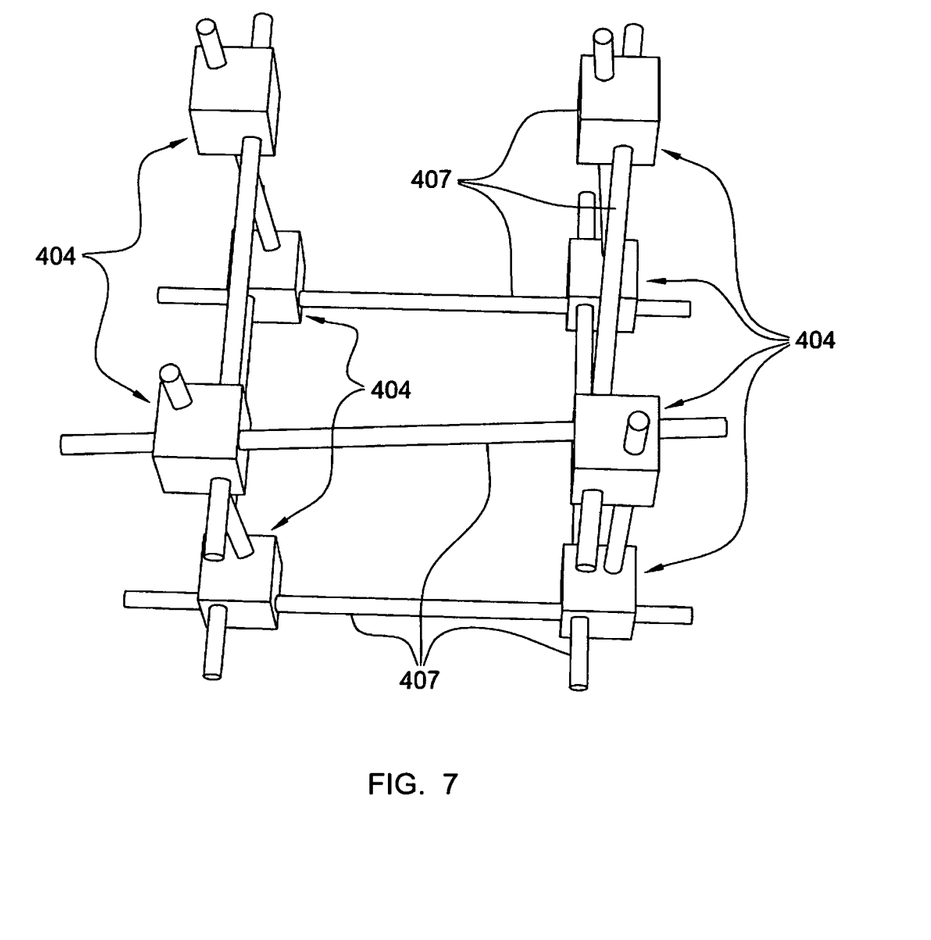
FIG. 7 shows a perspective view of a rectangular structure using a three-axis foldable axial joint according to devices herein.
Figure 8A:
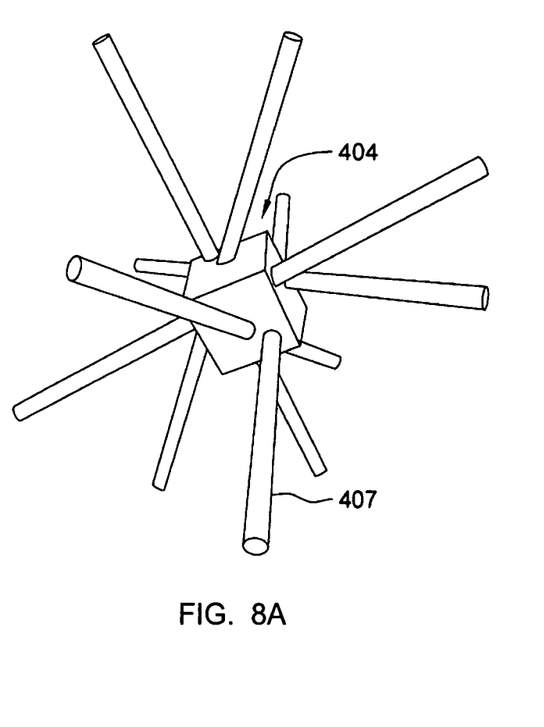
FIGS. 8A and 8B show a multi-axis foldable axial joint according to devices herein.
Figure 8B:
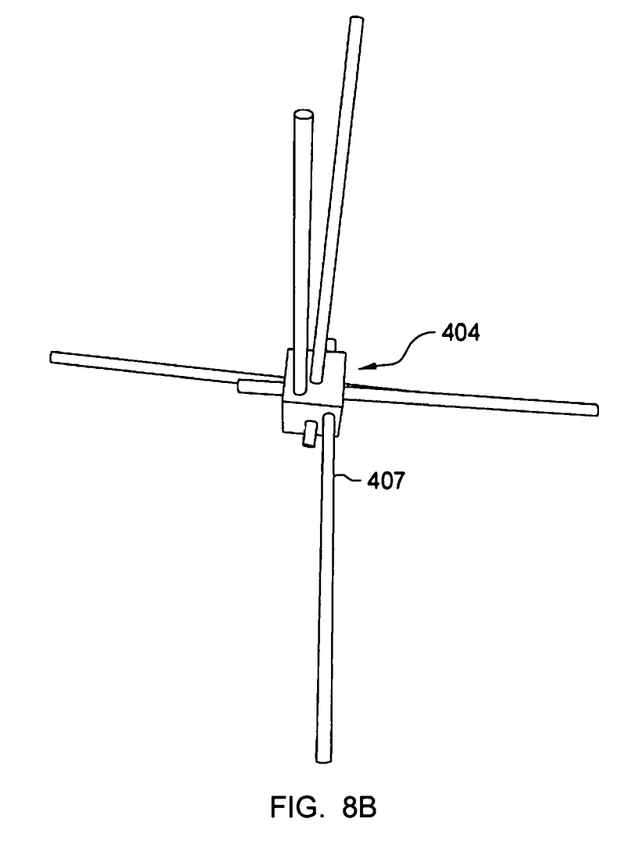

Several configurations of axial joints 404 can be used to assemble a stand to hold shaped charges for EOD use. As shown in FIGS. 5-8A and 8B, a plurality of elongate members 407 may be used for various size/weight of the elongate members 407 and equipment. Various frameworks can be prepared, and no tools are needed to hold the axial joint 404 in its 3D shape for shaped charge stands, disrupter stands, tool/equipment stands, etc. in FIG. 5, a triangular or pyramidal structure uses a single three-axis axial joint 404 and three elongate members 407 arranged at an acute angle with each other. In FIGS. 6 and 7, a square or rectangular structure uses four three-axis axial joints 404 and ten or more elongate members 407 arranged substantially orthogonal at each respective axial joint 404. FIGS. 8A and 8B show a multi-axis axial joint 404 in which the elongate members 407 do not necessarily extend between apertures 303 directly aligned with each other. Such an arrangement can be used for irregularly shaped EOD charges.

Figure 9:
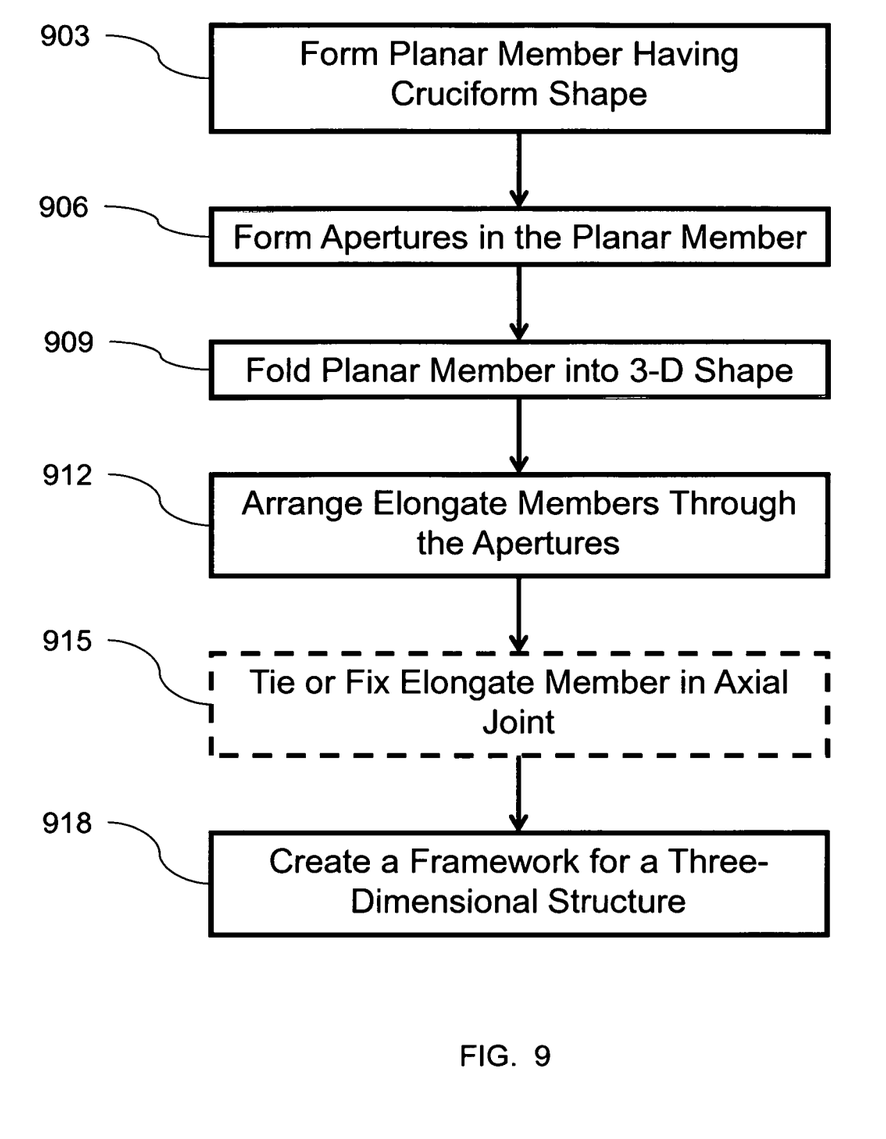
FIG. 9 is a flow chart illustrating methods herein.

FIG. 9 is a flow chart illustrating a specific embodiment of the invention herein. At 903, a planar member having a cruciform shape is formed. The cruciform shape is made of several connected sections. each section is foldable approximately perpendicular to an adjacent section.

At 906, apertures are formed in each section of the planar member. The apertures may be punched, stamped, or cut-out of the planar member in any appropriate shape, such as round, rectangular, square, pentagonal, hexagonal, L-shaped, etc. The apertures are formed in a pattern including up to nine openings.

At 909, the planar member is folded into a three-dimensional shape to form an axial joint such that opposite faces have a congruent pattern of apertures, after folding.

At 912, an elongate member is arranged through the apertures of one or more sections of the planar member, after folding the sections of the planar member. The elongate member may have different cross-sectional shapes (solid, hollow, circular, L-shaped, I-shaped, etc.). That is, the elongate member can be shaped to conform to the shape of the apertures. The apertures may have a seal or other type of friction device to prevent the elongate member from being pulled out.

At 915, the elongate members may be optionally tied or fixed in place using a binding (i.e., tape, rope, pin, etc.) with the axial joint to keep the elongate member from pulling out.

At 918, a framework for a three-dimensional structure is created using one or more axial joints.

The disclosed invention allows a low cost, axial joint to be used with various sizes of tubes or rods to fabricate frameworks for various EOD tools and equipment. In addition, the joint can be modified for various sizes and weights of components and equipment. Various frameworks can be constructed using multiple axial joints. The axial joint can be made from a flat-pack planar member or out of a solid piece using various materials, depending on the level of flexibility desired.

Some of the advantages of the invention include a low cost, lightweight, one-time use, axial joint that can be packable and takes minimal space. The axial joint can be used to create a scalable, low cost, effective stand for use with a variety of EOD tools and equipment without needing tools to assemble/disassemble.

The invention has been described with references to specific embodiments. While particular values, relationships, materials, and steps have been set forth for purposes of describing concepts of the invention, it will be appreciated by persons skilled in the art that numerous variations and/or modifications may be made to the invention as shown in the disclosed exemplary embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain exemplary embodiments and modifications of the concept underlying the present invention, various other embodiments as well as potential variations and modifications of the exemplary embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present exemplary embodiments are to be considered in all respects as illustrative and not restrictive.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various exemplary embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, terms such as "right", "left", "vertical", "horizontal", "top", "bottom", "upper", "lower", "under", "below", "underlying", "over", "overlying", "parallel", "perpendicular", etc., as used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A device, comprising:
    a planar member, said planar member comprises a first axis and a second axis, said first axis being perpendicular to said second axis, said planar member comprises a first plurality of sections along said first axis and a second plurality of sections along said second axis, each section of said first plurality of sections and said second plurality of sections comprises one of a rectangular shape and a square shape having a pattern of apertures therein,
    wherein each section of the plurality of sections includes a same number of said apertures as other said each sections,
    wherein said each section includes at least one aperture of said apertures,
    wherein each section is foldable approximately perpendicular to an adjacent section,
    wherein the pattern of apertures in a first section is configured after folding to be congruent with the pattern of apertures in a second section after folding, said second section is parallel to said first section, after folding, and
    wherein each device is a continuous, single structure.

2. The device according to claim 1, wherein, after folding, said planar member forms a box-shaped device having congruent patterns of apertures on opposite faces.

3. The device according to claim 1, wherein said planar member includes five sections in each of the first axis and the second axis.

4. The device according to claim 1, wherein each section in said first plurality of sections and said second plurality of sections is connected to at least one adjacent section.

5. The device according to claim 4, wherein said at least one adjacent section is connected by a hinge.

6. The device according to claim 1, wherein said pattern of apertures comprises up to nine apertures.

7. The device according to claim 1, wherein said apertures comprise a shape selected from one of:
    round;
    rectangular;
    square;
    pentagonal;
    hexagonal;
    L-shaped; and
    I-shaped.

8. The device according to claim 1, further comprising an elongate member being arranged through the apertures of at least one section of the planar member, after folding said at least one section of the planar member.

9. A device, comprising:
    a planar member, said planar member comprises a first axis and a second axis, said first axis being perpendicular to said second axis, said planar member comprises a first plurality of sections along said first axis and a second plurality of sections along said second axis, each section of said first plurality of sections and said second plurality of sections comprises one of a rectangular shape and a square shape having a pattern of apertures therein, wherein each section of the first plurality of sections and the second plurality of sections includes a same number of said apertures as other said each sections, wherein said each section includes at least one aperture of said aperture, wherein each section is foldable approximately perpendicular to an adjacent section, wherein the pattern of apertures in a first section is configured after folding to be congruent with the pattern of apertures in a second section after folding, said second section is parallel to said first section, after folding, and wherein each device is a continuous, single cruciform shaped structure.

10. The device according to claim 9, wherein said each section includes at least one aperture of said apertures configured to receive an elongate member.

* * * * *